April 26, 1932.  A. D. TRENOR  1,855,370
PICTURE DISTORTING APPARATUS
Filed July 24, 1928   3 Sheets-Sheet 1
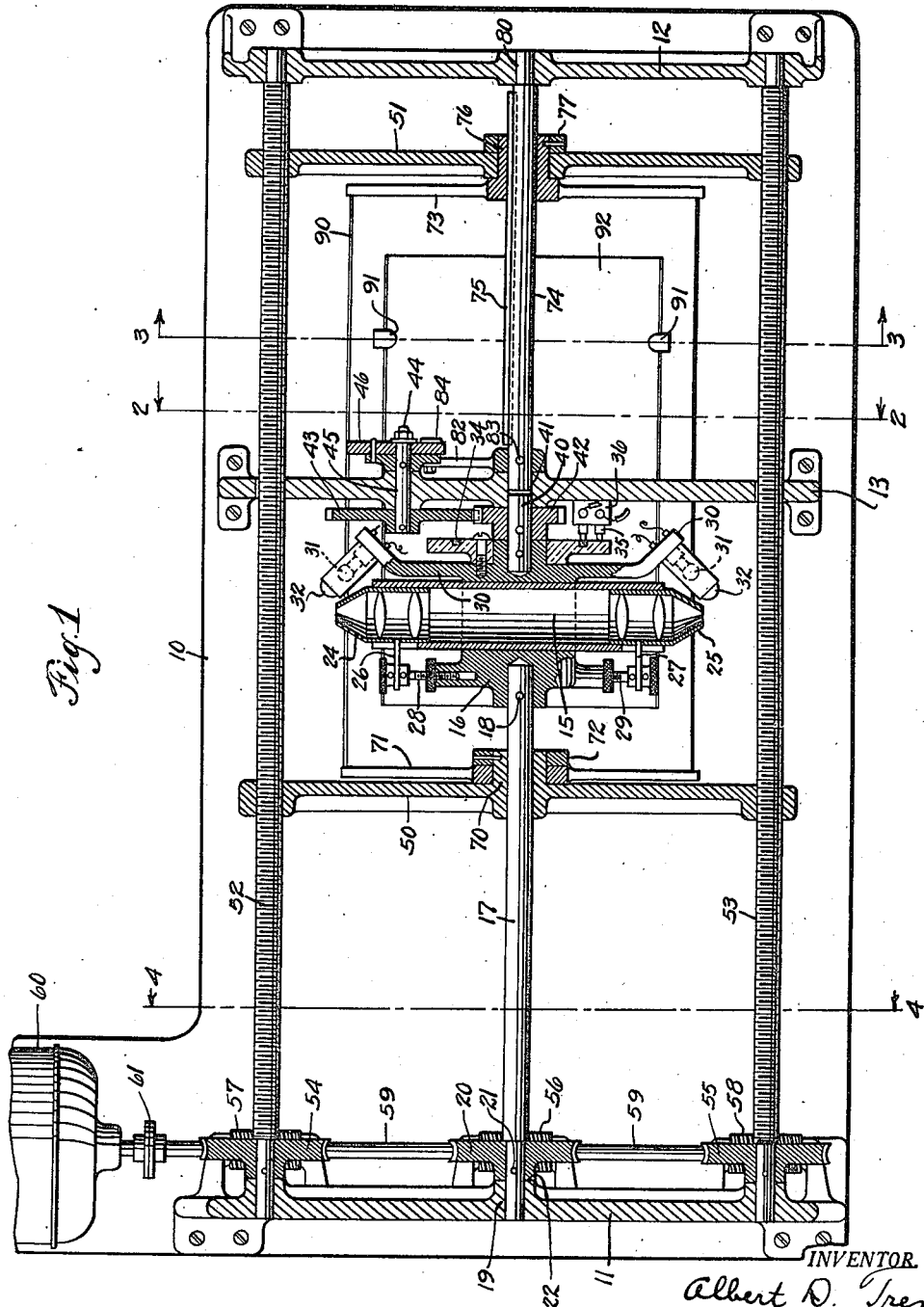

April 26, 1932.  A. D. TRENOR  1,855,370
PICTURE DISTORTING APPARATUS
Filed July 24, 1928   3 Sheets-Sheet 2
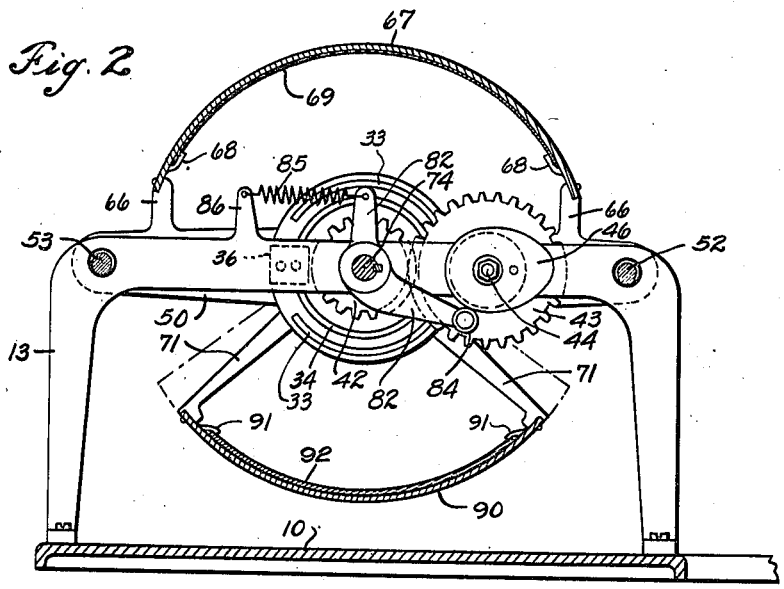
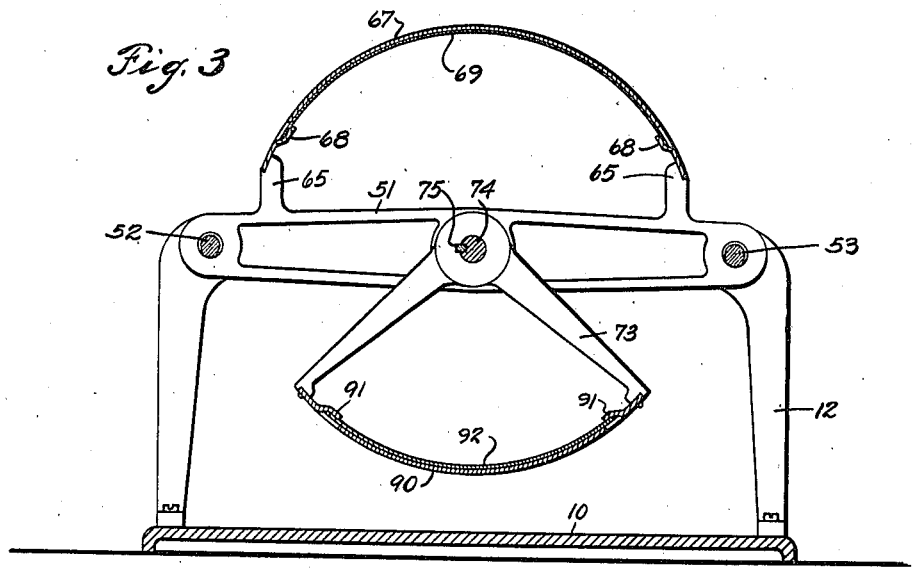
INVENTOR.
Albert D. Trenor
BY Albert M. Austin
ATTORNEY.

April 26, 1932. A. D. TRENOR 1,855,370

PICTURE DISTORTING APPARATUS

Filed July 24, 1928 3 Sheets-Sheet 3

INVENTOR.
Albert D. Trenor
BY Albert M. Austin
ATTORNEY

Patented Apr. 26, 1932

1,855,370

UNITED STATES PATENT OFFICE

ALBERT D. TRENOR, OF GLOUCESTER, MASSACHUSETTS, ASSIGNOR TO JOHN HAYS HAMMOND, JR., OF GLOUCESTER, MASSACHUSETTS

PICTURE DISTORTING APPARATUS

Application filed July 24, 1928. Serial No. 295,100.

This invention relates to picture distorting apparatus which may be employed for transferring an image to a sensitized film with various portions thereof displaced from their original relative positions.

In accordance with the invention a ray of light is caused to scan a given image and the reflected rays thereof are transferred to a sensitized film in such manner that the relative positions of the parts of the image are so distorted as to render the same unintelligible until it is again transferred by a reverse operation.

The invention provides a revolving telescope which is adapted to be moved progressively past the surface of a given image and to pick up and transfer the various portions of the image to a sensitized film. The film may be constantly moved in position relative to the original image so that the reflected rays are not impressed thereon in the usual position of a mirror image. The rate of movement of the film may be varied as desired so that reproduction of the original image by persons unfamiliar with the rate of movement employed will be practically impossible.

The apparatus comprises briefly a pair of cylindrical segments which are normally positioned in diametrically opposed relationship. The original image may be secured to one segment and the sensitized film to the opposite segment. Provision is made for irregularly moving one of said segments during the scanning operation. Scanning is accomplished by means of a telescope which is revolved about the axis of the cylindrical segments and picks up the reflected ray from the original image and impresses the same upon the sensitized film.

A duplicate of the original image may be produced from the distorted negative only by causing the same relative movements between the two elements in the reproducing apparatus as those which occurred in the original distorting apparatus.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a sectional elevation of a picture distorting apparatus constructed in accordance with this invention;

Fig. 2 is a section taken on the line 2—2 of Fig. 1 showing the mechanism for variably moving one of the cylindrical segments;

Fig. 3 is a section taken on the line 3—3 of Fig. 1 showing the mounting of the cylindrical segments;

Like reference characters denote like parts in the several figures of the drawings.

In the following description and in the claims parts will be identified by specific names for convenience, but they are intended to be as generic in their application to similar parts as the art will permit.

Figure 4:
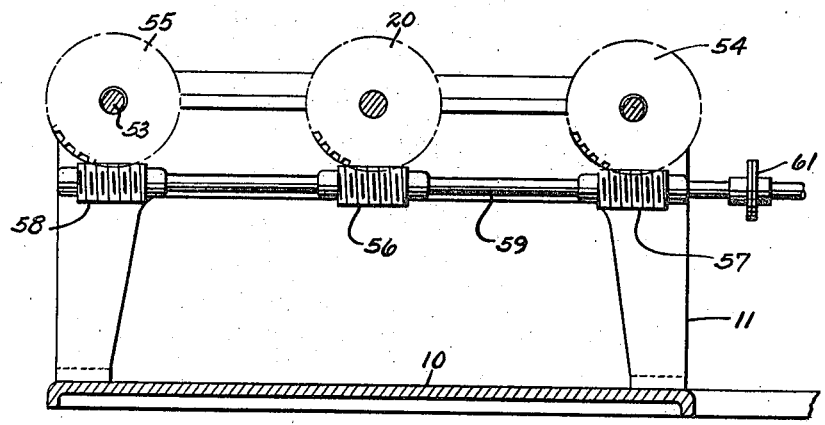
Fig. 4 is a section taken on the line 4—4 of Fig. 1 showing the driving mechanism.

Referring to the drawings more in detail, the distortion apparatus is shown as comprising a supporting plate 10, having a base member 11, a top supporting member 12 and an intermediate supporting member 13 affixed thereto. Telescope 15 is carried by supporting member 16 which is secured to the end of a rotating shaft 17 by any suitable means such as pin 18. Shaft 17 is journalled in a suitable bearing 19 in base member 11 and carries a worm wheel 20 (Figs. 1 and 4). Worm wheel 20 may be affixed to shaft 17 as by pin 21 and may bear against shoulder 22 formed on base member 11 to form a thrust bearing.

Telescope tube 15 is provided with a pair of lens sections 24 and 25 which may be adjusted by means of members 26 and 27 cooperating with thumb screws 28 and 29 which are threaded upon suitable rods carried on the supporting member 16.

Figure 5:
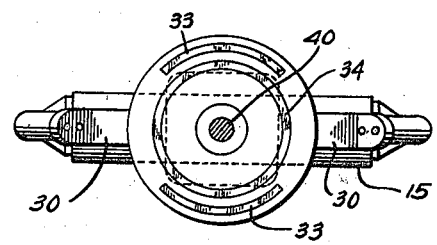
Fig. 5 is a detail view of the commutator and revolving lights which are employed for producing the scanning ray.

Arms 30 which are secured to supporting member 16 carry suitable light sources, such as bulbs 31 which are adapted to project a ray of light through lenses 32 on to the image which is to be transferred. Lights 31 are electrically connected to commutator segments 33 and 34 (Fig. 5) which are adapted to contact with brushes 35, said brushes being carried in a suitable brush holder 36 from intermediate support 13.

Upper supporting shaft 40 is secured in support 16 above arms 30 and is adapted to rotate in bearing 41 in intermediate supporting member 13. Shaft 40 also carries spur gear 42 which meshes with a second spur gear 43 carried upon shaft 44. Shaft 44 is journalled in bearing 45 in intermediate support 13 and carries a cam 46 which is rigidly secured thereto and adapted to rotate in conjunction with spur gear 43.

Cross bars 50 and 51 are in threaded engagement with threaded shafts 52 and 53, which are journalled in suitable bearings in base member 11 and top support 12. Shafts 52 and 53 carry worm wheels 54 and 55 which are supported from base member 11 in a manner similar to that described in connection with worm wheel 20. Said worm wheels 20, 54 and 55 are in mesh with worm gears 56, 57 and 58 which are carried upon driving shaft 59. Shaft 59 is operatively connected to driving motor 60 by any suitable means, such as coupling 61.

Projecting tabs 65 and 66 are secured to cross bars 51 and 50 respectively and carry cylindrical segment 67 which is provided with suitable means such as clips 68 for supporting the object to be distorted, which may be formed of any desired material such as flexible sheet 69.

Cross bar 50 is provided with an elongated hub member 70 through which rod 17 may freely pass. Spider 71 is journalled on said hub member and secured thereto as by retaining ring 72. Spider 73 is slidably secured on shaft 74 as by key 75 and carries a hub member 76 which is journalled in cross bar 51 and adapted to rotate therein. Retaining ring 77 may be employed for preventing longitudinal movement between bar 51 and spider 73.

Shaft 74 is journalled in suitable bearings 80 and 41 in top support 12 and intermediate support 13 respectively. Rocker arm 82 is secured to shaft 74 as by pin 83 and carries on the outer end thereof a contact member such as wheel 84 which bears against the surface of cam 46 (Fig. 2). Spring 85 may be secured between rocker arm 82 and a suitable projection 86 formed on intermediate support 13 for holding wheel 84 in contact with the surface of cam 46.

A cylindrical segment 90 is carried by spiders 71 and 73 and is provided with suitable clips 91 for holding a sensitive film 92.

Brushes 35 and commutator segments 33 and 34 are so arranged that lights 31 will be alternately connected to a supply circuit and rendered operative when adjacent image 69. The circuit is, however, broken and the lights extinguished when they are in a position adjacent sensitized film 92. At each instant, therefore, when one end of telescope 15 is adjacent image 69 light 31 projects a scanning ray against said image which is reflected and transmitted through telescope 15 to sensitized film 92.

In the operation of the above described apparatus, shaft 17 and telescope 15 affixed thereto are constantly rotated through gears 20 and 56 by means of motor 60. The ends of said telescope are alternately brought into operative relation with the image 69 and film 92. Cam 46 is constantly rotated through gears 42 and 43 and causes an oscillatory movement of rocker arm 84. This oscillatory movement is imparted to shaft 74 and to spider 73 which is keyed thereto causing a corresponding movement of arcuate member 90 and sensitized film 92.

Threaded shafts 52 and 53 are rotated by motor 60 through their cooperating worm gears and cause a progressive movement of cross bars 50 and 51 which are threaded thereon. Cylindrical segment 67 which is carried by said cross arms, together with spiders 71 and 73, and cylindrical segment 91 carried thereby, simultaneously move longitudinally of the axis of rotation of telescope 15. At the same time cam 46 causes an oscillatory movement of arcuate member 90 which causes the reflected image to be displaced on the film 92 from the position which it would otherwise assume.

The amount of distortion of the reflected image may be controlled by varying the surface of cam 46. It is desirable, therefore, to provide a plurality of such cams which may be substituted as desired. The image which is obtained on film 92 will be unintelligible and may be transferred to a distant point by any desired means without danger of interception. In order to reproduce the original image therefrom an apparatus similar to the above must be employed, the transmitted image being positioned on movable segment 90 and the sensitized film on which the original image is to be duplicated being positioned on segment 67.

In the above description the original image has been described as placed on segment 67 and the sensitized film on movable segment 90, it is obvious the positions may be reversed providing a corresponding reversal takes place in the reproducing apparatus. The selected cam may be transmitted to the distant point separately from the sensitized film or a series of numerals may be employed to designate cams which are maintained at the transmitting and receiving stations. In the latter case a simple numeral placed on the face of the transmitted film will serve as a key and will enable the operator at the receiving end to accurately reproduce the image although it will be meaningless to any third persons by whom the film might be intercepted.

In the receiving apparatus the connections to the lights 31 must also be reversed so as to illuminate the image placed on segment 90.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A picture distortion apparatus comprising means for holding an image and sensitized film as cylindrical segments in diametrically opposed relationship, a rotating telescope mounted coaxially of said segments, means for lighting the surface of said image and for passing reflected rays through said telescope onto said film, and means for vibrating said film whereby the relationship of the component parts of said image is altered thereon.

2. A picture distortion apparatus comprising means for holding an image and sensitized film as cylindrical segments in diametrically opposed relationship, a rotating telescope mounted coaxially of said segments, means for lighting the surface of said image and for passing reflected rays through said telescope onto said film, means for vibrating said film whereby the relationship of the component parts of said image is varied thereon, and means for causing relative longitudinal movement between said telescope and said cylindrical segments.

3. A picture distortion apparatus comprising a double ended rotating telescope, a pair of cylindrical elements for supporting an image and a sensitized sheet arranged in diametrically opposed relationship with respect to the axis of rotation of said telescope, a shaft supporting one of said elements and means for vibrating said shaft when said telescope is rotated whereby the symmetry of said elements is altered.

4. A picture distortion apparatus comprising a double ended rotating telescope, a pair of cylindrical elements for supporting an image and a sensitized sheet arranged in diametrically opposed relationship with respect to the axis of rotation of said telescope, a shaft supporting one of said elements and means for vibrating said shaft when said telescope is rotated whereby the symmetry of said elements is altered, comprising a cam operatively geared to said telescope and a rocker arm carried by said shaft and contacting therewith.

5. In a picture distortion apparatus, a pair of threaded shafts, cross arms carried thereby, a cylindrical member carried by said cross arms, a second shaft journalled at the axis of said cylindrical member, a second cylindrical member carried by said second shaft, and means for causing oscillatory movement of said second member relative to said first member said cylindrical members forming a support for an image and a sensitized sheet.

6. In a picture distortion apparatus, a pair of threaded shafts, cross arms carried thereby, a cylindrical member carried by said cross arms, a second shaft journalled at the axis of said cylindrical member, a second cylindrical member carried by said second shaft, and means for causing oscillatory movement of said second member relative to said first member, comprising a rotating cam and a rocker arm associated with said second member and contacting with said cam said cylindrical members forming a support for an image and a sensitized sheet.

7. In a picture distortion apparatus, a pair of threaded shafts, cross arms carried thereby, a cylindrical member carried by said cross arms, a third shaft journalled at the axis of said cylindrical member, a second cylindrical member carried by said third shaft, means for causing oscillatory movement of said second member relative to said first member, comprising a rotating cam and a rocker arm associated with said second member and contacting with said cam, and a telescope mounted for rotational movement about the axis of said cylindrical members, said cylindrical members forming a support for an image and a sensitized sheet.

8. In a picture distortion apparatus, a pair of threaded shafts, cross arms carried thereby, a cylindrical member carried by said cross arms, a third shaft journalled at the axis of said cylindrical member, a second cylindrical member carried by said third shaft, means for causing oscillatory movement of said second member relative to said first member, comprising a rotating cam, and a rocker arm associated with said second member and contacting with said cam, a telescope mounted for rotational movement about the axis of said cylinders, and means mounted on said telescope for projecting a ray of light onto one of said cylinders when said telescope is rotated said cylindrical members forming a support for an image and a sensitized sheet.

9. A picture distortion apparatus comprising means for holding an image and sensitized film as segments in diametrically opposed relationship, a rotating telescope mounted coaxially of said segments, means for lighting the surface of said image and for passing reflected rays through said telescope onto said film, and means for vibrating said film whereby the relationship of the component parts of said image is altered thereon.

10. A picture distortion apparatus comprising means for holding an image and sensitized film as segments in diametrically opposed relationship, a rotating telescope mounted coaxially of said segments, means for lighting the surface of said image and for passing reflected rays through said telescope onto said film, means for vibrating said film whereby the relationship of the component parts of said image is varied thereon, and means for causing relative longitudinal movement between said telescope and said segments.

11. A picture distortion apparatus comprising means for holding an image and sensitized film as cylindrical segments in diametrically opposed relationship, a telescope mounted coaxially of said segments, means for causing relative rotational movement between said telescope and said segments, means for lighting the surface of said image and for passing rays modified in accordance with said image through said telescope and applying said rays to said film, and means for causing relative irregular movement between said film and said image whereby the relationship of the component parts of said image is altered on said film.

In testimony whereof I have hereunto set my hand.

ALBERT D. TRENOR.